US010210340B2

(12) United States Patent
Wood et al.

(10) Patent No.: US 10,210,340 B2
(45) Date of Patent: Feb. 19, 2019

(54) FILE SHARING WITH A HOSTILE SYSTEM (75) Inventors: Robert H. Wood, Waterloo (CA); Maxime M. Matton, Waterloo (CA); Christopher E. S. Pattenden, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 1165 days.

(21) Appl. No.: 11/773,913

(22) Filed: Jul. 5, 2007

(65) Prior Publication Data
US 2009/0011747 A1  Jan. 8, 2009

(51) Int. Cl.
*G06F 21/62* (2013.01)

(52) U.S. Cl.
CPC .................. *G06F 21/6218* (2013.01)

(58) Field of Classification Search
CPC ........ G06F 9/542; H04L 43/10; H04W 48/16; H04W 88/06; H04W 8/183
USPC .............................. 455/550; 710/68
See application file for complete search history.

(56) References Cited

U.S. PATENT DOCUMENTS

| | | | | |
|---|---|---|---|---|
| 6,584,520 B1* | 6/2003 | Cowart et al. | .................. | 710/68 |
| 7,549,047 B2* | 6/2009 | Balfanz et al. | ............... | 713/169 |
| 2003/0221122 A1* | 11/2003 | Hatori | ........................... | 713/200 |
| 2004/0088316 A1* | 5/2004 | Cleraux | ............ | G06F 17/30067 |
| 2004/0103280 A1 | 5/2004 | Balfanz et al. | | |
| 2005/0091289 A1* | 4/2005 | Shappell et al. | ............... | 707/201 |
| 2006/0075063 A1* | 4/2006 | Grosse et al. | ................ | 709/217 |
| 2006/0184673 A1* | 8/2006 | Liebman | ...................... | 709/225 |

FOREIGN PATENT DOCUMENTS

| | | |
|---|---|---|
| CN | 1849600 A | 10/2006 |
| EP | 863453 A1 | 9/1998 |
| EP | 1635259 A2 | 3/2006 |
| WO | 2002097592 A2 | 12/2002 |
| WO | 2005/089446 * | 3/2005 |
| WO | 2005089446 A2 | 9/2005 |
| WO | 2005118492 A1 | 12/2005 |
| WO | 2006056881 A1 | 6/2006 |

OTHER PUBLICATIONS

EP Examination Report; EP Patent Application No. 07113399.5; dated Feb. 3, 2009; 3 pgs.
Research in Motion Limited; European Search Report; Application No. 07113399.5-2212; dated Dec. 3, 2007; 5 pgs.
State Intellectual Property Office of People's Republic of China; Chinese Application No. 200810128228.3; First Office Action; dated Feb. 12, 2010; 7 pgs.

(Continued)

*Primary Examiner* — Natasha W Cosme
(74) *Attorney, Agent, or Firm* — Conley Rose, P.C.; J. Robert Brown, Jr.; Albert A. Abbou (57) ABSTRACT

A mobile device is provided. The mobile device comprises a storage device storing one or more files and a serial port for connecting the mobile device to a remote system. The mobile device further comprises a user interface allowing a user of the mobile device to select a file stored on the storage device such that when the mobile device is connected to the remote system via the serial port, the remote system can only access the selected file.

20 Claims, 10 Drawing Sheets

(56) References Cited

OTHER PUBLICATIONS

Minutes of the Oral Proceedings before the Examining Division mailed May 17, 2010; European Application No. 07113399.5-2212; Dec. 3, 2007; 4 pgs.
Decision to Refuse a European Patent Application dated May 17, 2010; Application No. 07113399.5-2212; Dec. 3, 2007; 24 pgs.
EP Communication; Second Examination Report dated Jul. 7, 2008; European Application No. 07113399.5-2212; Dec. 3, 2007; 4 pgs.
EP Search and Examination Report dated Nov. 18, 2010, EP 10181477.0, 5 pages.
Second Chinese Office Action; Application No. 200810128228.3; dated Jul. 7, 2011; 8 pages.
Chinese Office Action; Application No. 200810128228.3; dated Apr. 20, 2012; 13 pages.
Chinese Office Action; Application No. 200810128228.3; dated Apr. 19, 2013; 22 pages.
European Examination Report; Application No. 10181477.0; dated Jul. 9, 2012; 4 pages.
Chinese Office Action; Application No. 200810128228.3; dated Dec. 5, 2012; 11 pages.
Corbet; "Shared Subtrees"; LWN.net; http://web-archive.org/web/20070606132639/http://lwn.net/Aricles/159077/06.06.2007; Nov. 8, 2005; 6 pages.
European Summons to Attend Oral Proceedings; Application No. 07113399.5; Dec. 15, 2009; 11 pages.
Canadian Office Action; Application No. 2,635,933; dated Apr. 12, 2011; 2 pages.
Canadian Office Action; Application No. 2,635,933; dated Sep. 14, 2012; 2 pages.
Chinese Office Action; Application No. 200810128228.3; dated Sep. 4, 2013; 27 pages.
Canadian Office Action; Application No. 2,635,933; dated Jan. 21, 2014; 3 pages.
Indian Office Action; Application No. 1565/DEL/2008; dated Mar. 10, 2014; 1 page.
European Examination Report; Application No. 10181477.0; dated Dec. 10, 2014; 4 pages.
European Summons to Attend Oral Proceedings; Application No. 07113399.5; Jun. 18, 2015; 22 pages.
Indian Hearing Notice; Application No. 1565/DEL/2008;Sep. 3, 2015; 2 pages.
Canadian Office Action; Application No. 2,635,933; dated Feb. 12, 2015; 3 pages.
Canadian Office Action; Application No. 2,635,933; dated Feb. 29, 2016; 4 pages.
European Examination Report; Application No. 10181477.0; dated Oct. 4, 2017; 5 pages.
Canadian Office Action; Application No. 2,635,933; dated Feb. 6, 2017; 4 pages.
Canadian Office Action; Application No. 2,635,933; dated Jan. 25, 2018; 4 pages.
European Examination Report; Application No. 10181477.0; Nov. 28, 2018; 4 pages.

* cited by examiner

FILE SHARING WITH A HOSTILE SYSTEM

BACKGROUND

Mass storage devices, such as removable memory cards, are a common way of increasing the amount of data, such as documents and files, that can be stored on a mobile device and make it easier for the mobile device to share data with remote systems.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In a typical file-sharing situation, a mobile device is connected to a remote system by a serial port, such as a universal serial bus (USB) port. Once the mobile device detects that it is connected to a remote system, the mobile device then asks the user if the user would like for the remote system to have access to the data on the mass storage device. At this point, the user has only one of two choices, completely deny the remote system access to any of the data on the mass storage device or grant the remote system full access to all of the data on the mass storage device.

In an embodiment, a mobile device is provided. The mobile device comprises a storage device storing one or more files and a serial port for connecting the mobile device to a remote system. The mobile device further comprises a user interface allowing a user of the mobile device to select a file stored on the storage device such that when the mobile device is connected to the remote system via the serial port, the remote system can only access the selected file.

In another embodiment, a mobile device is provided. The mobile device comprises a storage device storing one or more files and a serial port for connecting the mobile device to a remote system. The mobile device further comprises a user interface allowing a user of the mobile device to select a file stored on the storage device and designate whether the selected file will be accessed by the remote system as read/write or read-only such that when the mobile device is connected to the remote system via the serial port, the remote system can only access the selected file and can only access the selected file as read/write or read-only as designated by the user.

In another embodiment, a method of file sharing between a mobile device and a remote system is provided. The method comprises storing one or more files in a first file system on the mobile device, selecting one or more files from the first file system to be shared with the remote system, and connecting the mobile device to the remote system.

Figure 1:
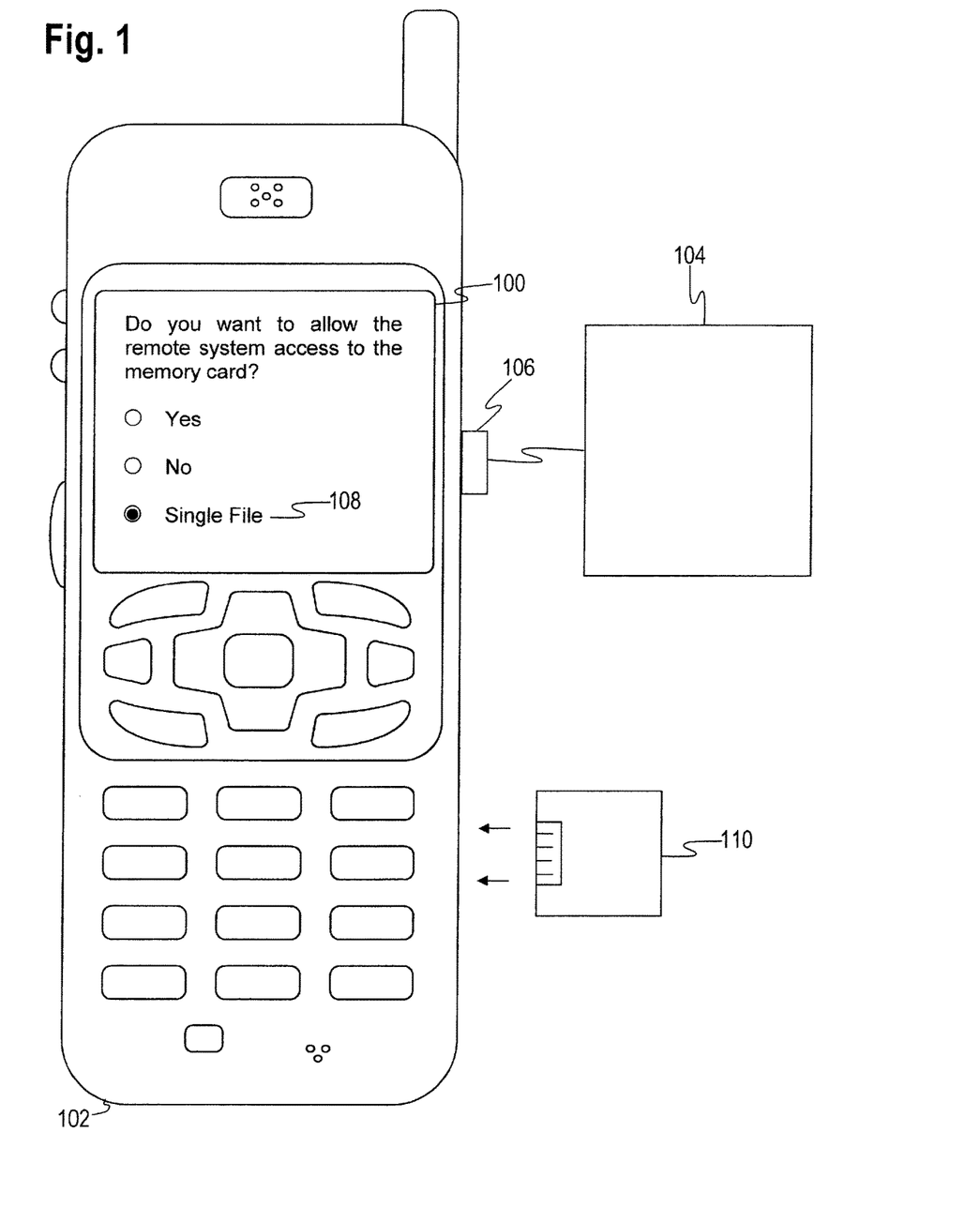
FIG. 1 illustrates a user interface displaying options for file sharing according to an embodiment of the disclosure.

FIG. 1 illustrates a user interface 100 displaying options for file sharing according to an embodiment of the disclosure. In this embodiment, a user of a user equipment (UE) 102 desires to share one or more files from a mass storage device 110 with a remote system 104. Also, although mass storage device 110 is depicted as a removable memory card, mass storage device 110 may be any mass storage device known to one skilled in the art. The user shares the files from mass storage device 110 by connecting UE 102 to remote system 104 using a serial port 106. Serial port 106 may be any type of serial port known to one skilled in the art, including a universal serial bus port, a firewire, or an RS-232 serial port. Furthermore, while remote system 104 is shown as connecting with UE 102 by means of a serial port, one of ordinary skill in the art would recognize that any means of accessing mass storage device 110 on UE 102, including wireless access, may be utilized.

However, rather than sharing all of the files on mass storage device 110 with remote system 104, the user would like to share only selected files without allowing remote system 104 access to or knowledge of the other files. The present disclosure may employ a user interface, such as user interface 100, to assist the user. While a number of exemplary user interfaces are provided below, it should be appreciated that the present disclosure is not limited or restricted to these aspects and other user interfaces may be used and are within the spirit and scope of the present disclosure. In such a case, after UE 102 is connected to remote system 104, user interface 100 provides the user of UE 102 with an additional option 108 for sharing files from mass storage device 110 with remote system 104. This additional option 108 is to select a single file to share with remote system 104. In this figure, the single file option 108 is shown as selected.

While a particular number of files is depicted as being on mass storage device 110, persons of ordinary skill in the art will recognize that a larger or smaller number of files may be present on mass storage device 110 and any number of files may be selected.

Figure 2:
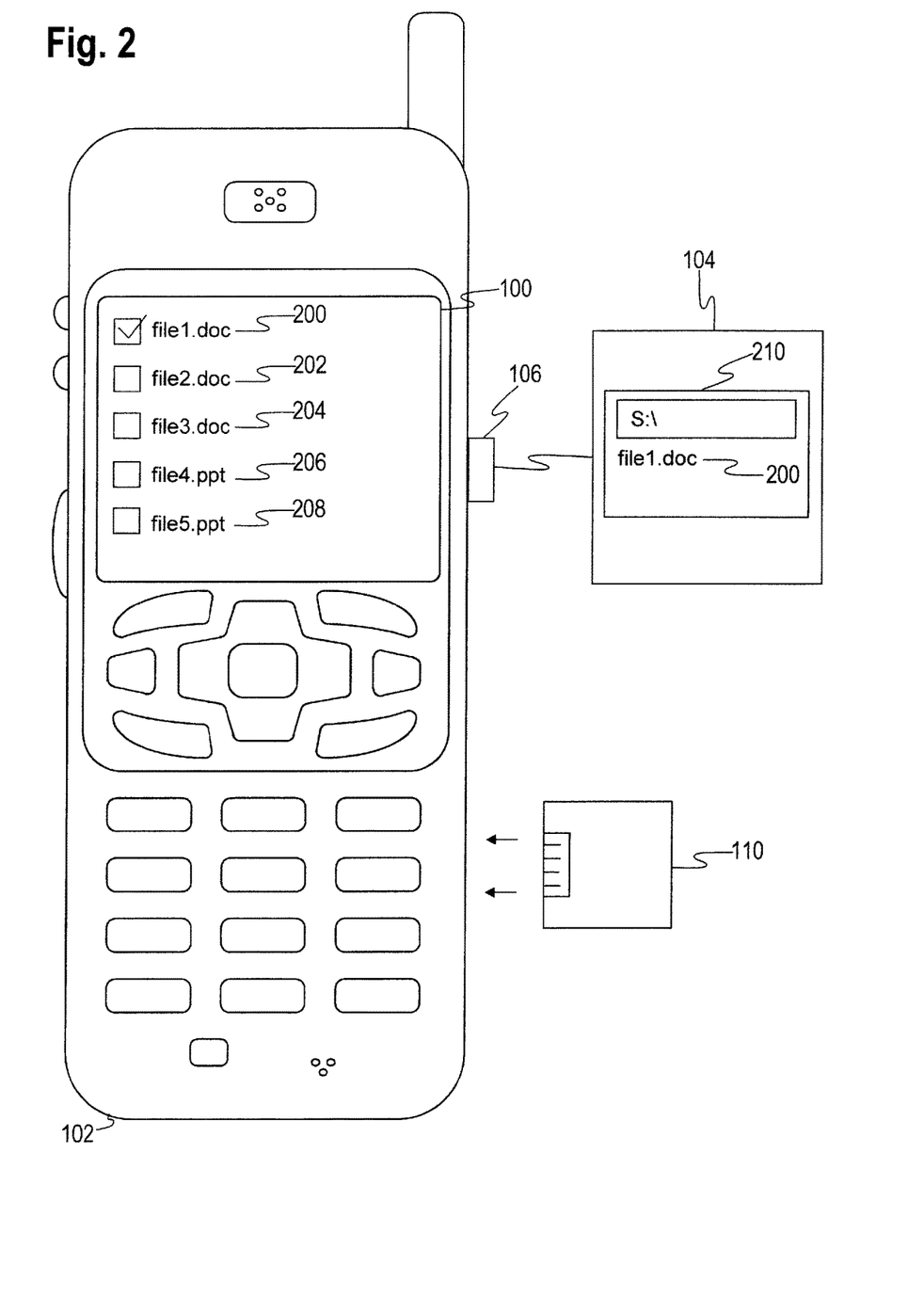
FIG. 2 illustrates a user interface displaying files from a mass storage device according to an embodiment of the disclosure.

Once the user has selected the single file option 108, a list of the files from mass storage device 110 is displayed on user interface 100. FIG. 2 illustrates user interface 100 displaying files 200, 202, 204, 206, and 208 from mass storage device 110 according to an embodiment of the disclosure. In this illustration, the user has selected file 200 for sharing. Once the user has selected a file to be shared with the remote system, the selected file will appear on the remote system as an external directory. In this case, selected file 200 now appears as single file 200 in a directory 210 on remote system 104. Accordingly, this embodiment allows a user to share file 200 with remote system 104 without allowing remote system 104 access to or even knowledge of files 202, 204, 206, or 208. As far as remote system 104 is concerned, file 200 is the only file on mass storage device 110. In some embodiments, the remote system 104 may be able to see, but not access or copy, other non-designated files.

Figure 3:
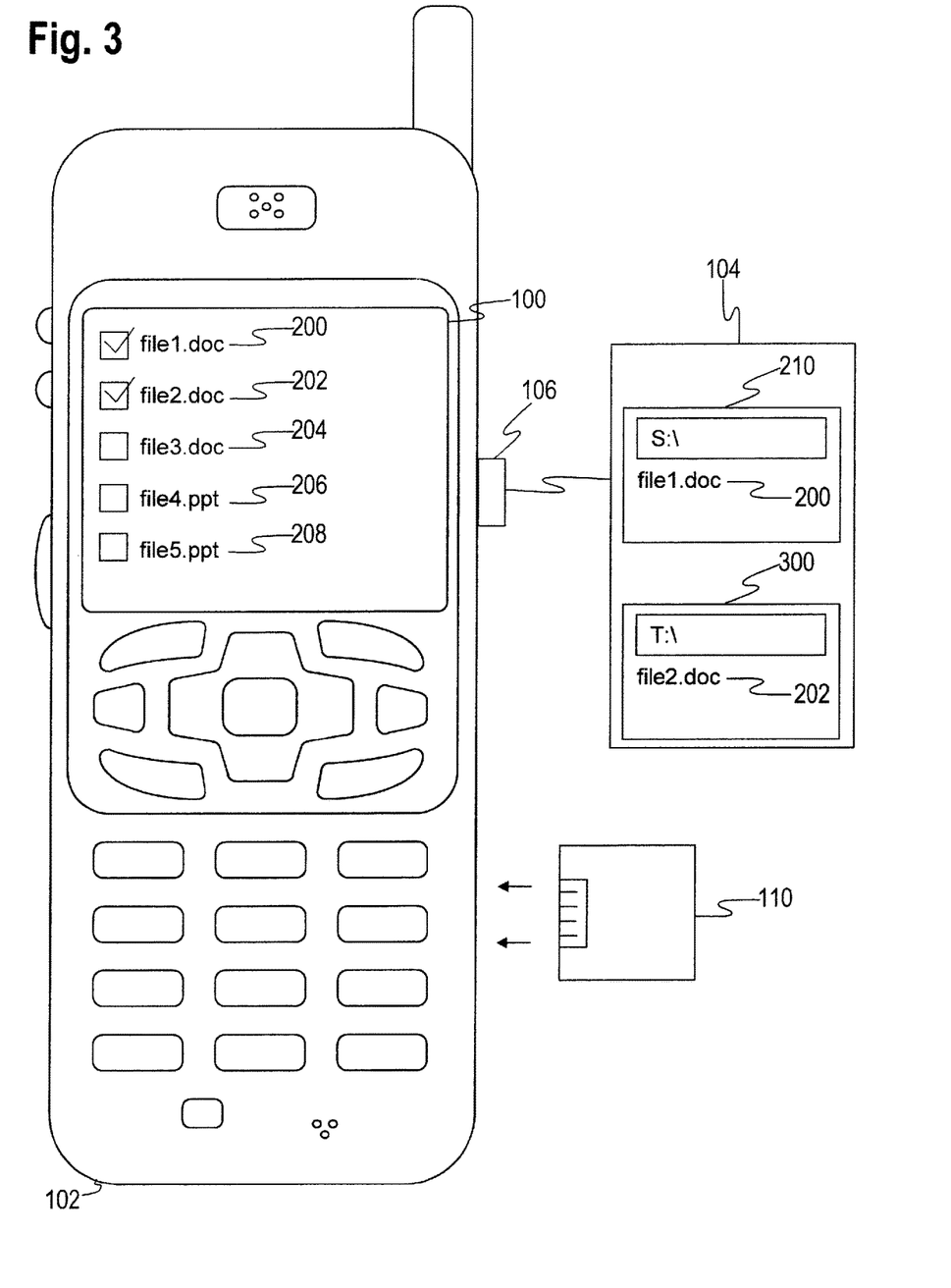
FIG. 3 illustrates an embodiment of the disclosure in which multiple files are selected for sharing with a remote system.

A user may also choose to share more than one file from mass storage device 110 with remote system 104. FIG. 3 illustrates an embodiment of the disclosure in which multiple files are selected for sharing with a remote system. In this case, after selecting single file option 108, the user has chosen to share two files with remote system 104, files 200 and 202. Remote system 104 may only see or have access to these two files as two separate external directories, directory 210 and a directory 300.

Figure 4:
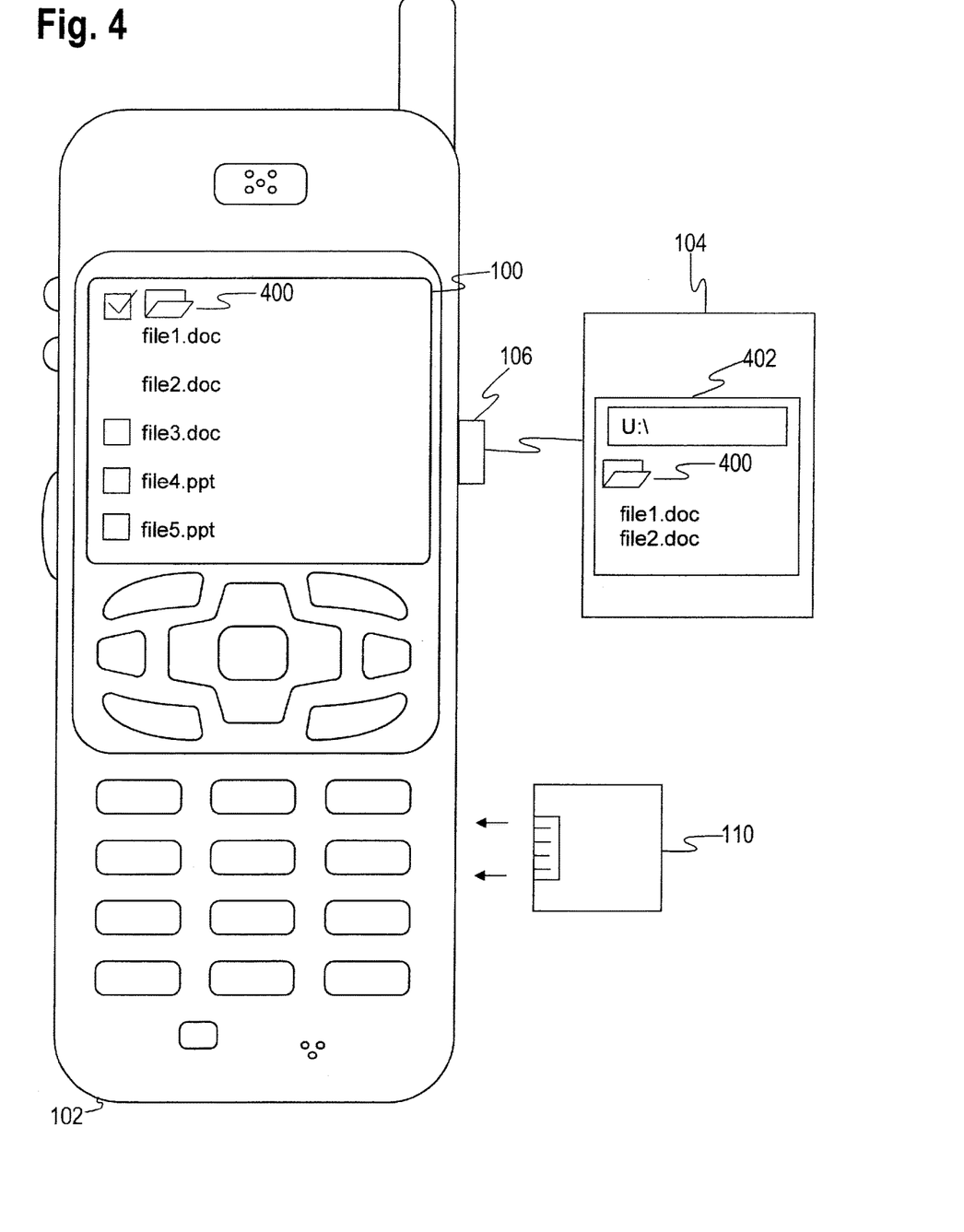
FIG. 4 illustrates another embodiment of the disclosure in which multiple files are selected for sharing with a remote system.

FIG. 4 illustrates another embodiment of the disclosure in which multiple files are selected for sharing with a remote system. In this case, a file folder 400 containing files 200 and 202 is selected by the user. File folder 400, along with files 200 and 202, would then appear on remote system 104 under a single external directory 402.

By restricting the access of remote system 104 to only the selected file or files, the user of UE 102 may prevent remote system 104 from seeing the other files on mass storage device 110. Such a restricted access may be due to personal, professional, legal, or other reasons. Restricted access may also be useful when a user of the UE 102 has concerns about the remote system 104 or its associated user. For example, a user of UE 102 may be concerned about malicious software that may be running on the remote system 104. In such a case, having restricted access may prevent the remote system not only from seeing the other files on mass storage device 110, but also from copying or corrupting them without the user's knowledge.

Figure 5:
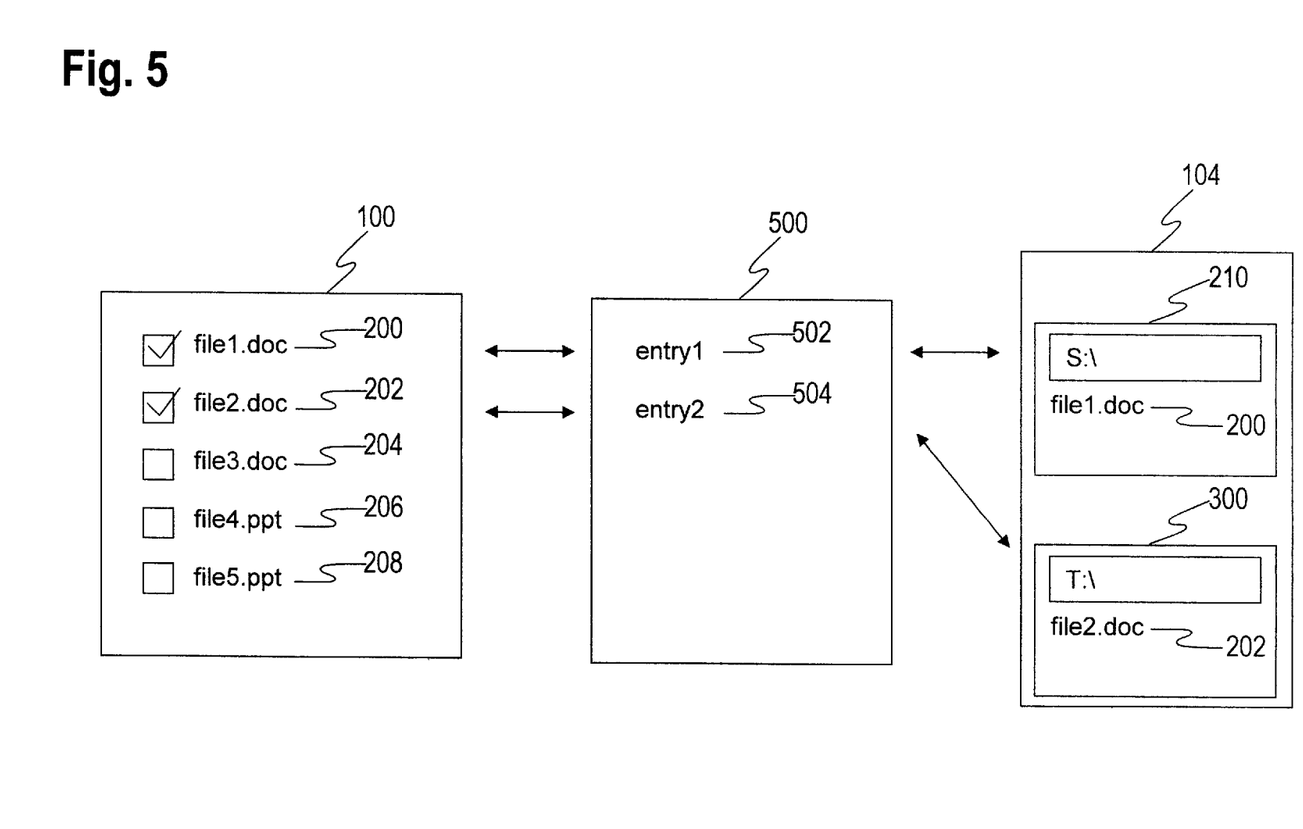
FIG. 5 illustrates a file system that is used to restrict the access of a remote system according to an embodiment of the disclosure.

FIG. 5 illustrates a second file system 500 that is used to restrict the access of remote system 104 according to an embodiment of the disclosure. In this embodiment, files 200 and 202 are shown as selected by the user. Once the files are selected, a first entry 502 is made in second file system 500, which references the location of selected file 200 on mass storage device 110. A second entry 504 is also made in second file system 500, which references the location of selected file 202 on mass storage device 110. Remote system 104 is only granted access to the information in second file system 500. Therefore, remote system 104 only has the information to access files 200 and 202 and is restricted to those files.

The file system on mass storage device 110 may be any type of file system known to one skilled in the art, including file allocation table (FAT) file system, file allocation table-32 (FAT-32) file system, New Technology File System (NTFS), second extended (Ext2) file system, third extended (Ext3) file system, and UNIX file system (UFS).

Second file system 500 may be created dynamically by firmware on UE 102 or may be a static file system on UE 102. Second file system 500 may also be any type of file system known to one skilled in the art, including file allocation table (FAT) file system, file allocation table-32 (FAT-32) file system, New Technology File System (NTFS), second extended (Ext2) file system, third extended (Ext3) file system, and UNIX file system (UFS). Further, while a second file system is depicted, persons of ordinary skill in the art will recognize that the restriction may be carried out according to several methods well known to one skilled in the art.

Figure 6:
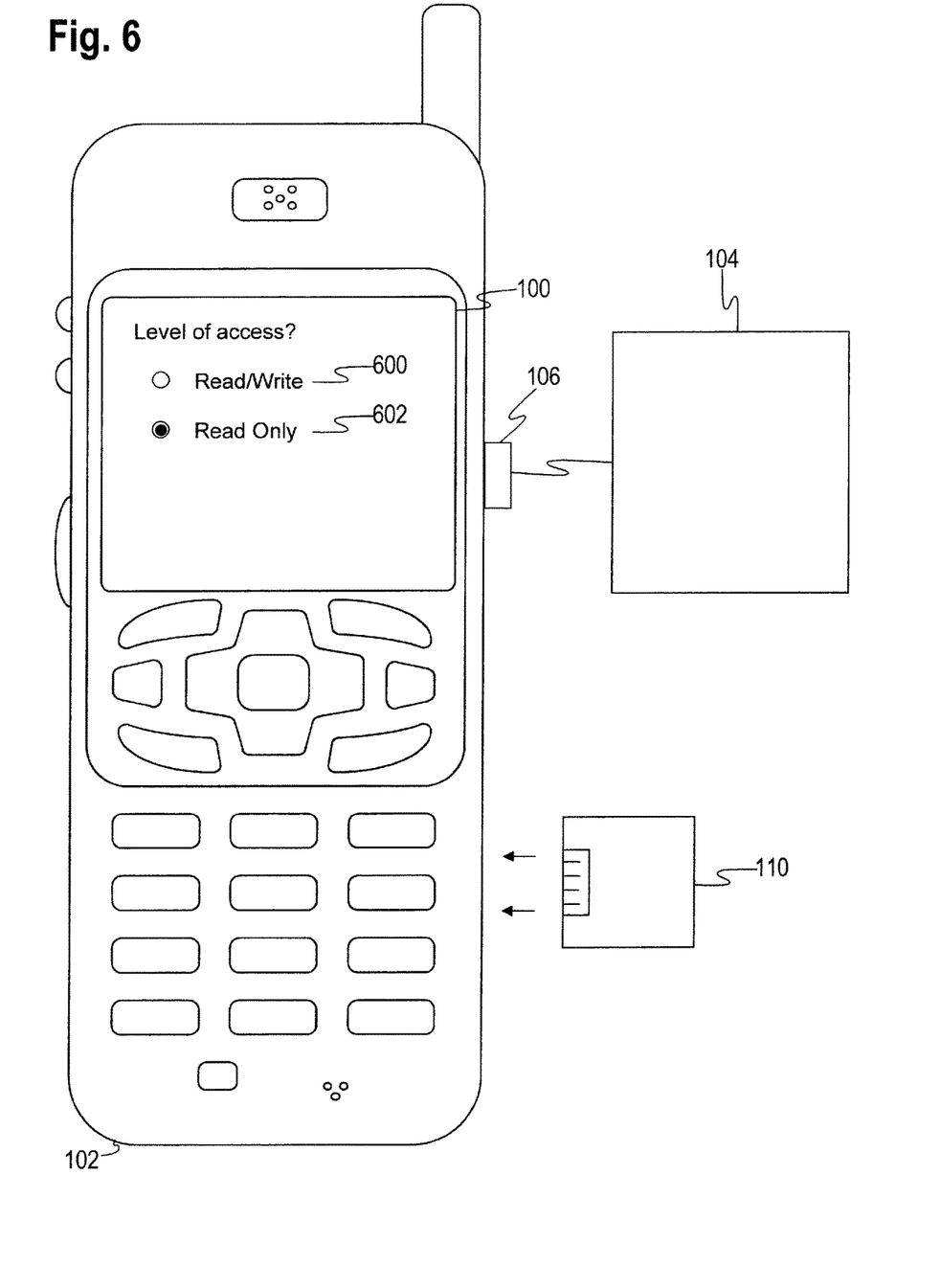
FIG. 6 illustrates another user interface displaying options for file sharing according to an embodiment of the disclosure.

FIG. 6 illustrates user interface 100 displaying options for file sharing according to an embodiment of the disclosure. Once a user has selected the files to be shared with remote system 104, in this embodiment, user interface 100 would allow a user to determine the level of access to grant remote system 104. In this embodiment, a read/write option 600 and a read-only option 602 are shown with the read-only option 602 selected. Depending upon the level of access selected, remote system 104 would then be granted access to the selected files at the selected level of access.

Figure 7:
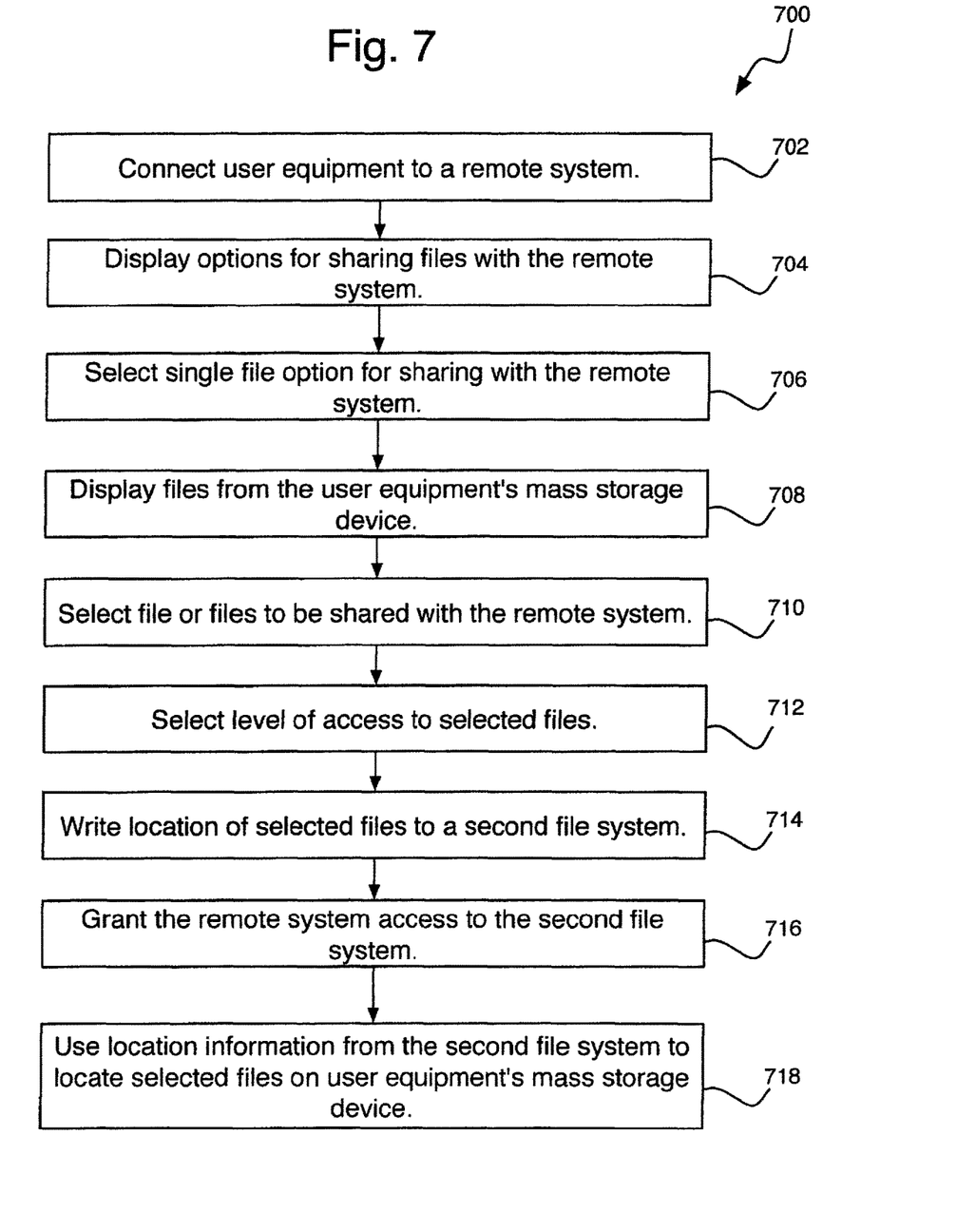
FIG. 7 shows a method of file sharing according to an embodiment of the disclosure.

FIG. 7 shows a method 700 of file sharing according to an embodiment of the disclosure. In this embodiment, a user equipment is connected to a remote system (block 702). Once the user equipment is connected to the remote system, a user interface on the user equipment displays the options that the user has for sharing files with the remote system (block 704). The options include sharing all of the files, none of the files, or a single or multiple files with the remote system. Upon selection of the single file option (block 706), a second user interface on the user equipment displays the files found in the user equipment's mass storage device (block 708). The user then selects the file or files that the user wants to share with the remote system (block 710). After the user has selected the files, a third user interface would allow the user to select the level of access to be granted to the remote system for the selected files, such as read/write or read-only access (block 712). The location for each of the selected file or files on the mass storage device is then written to a second file system (block 714). The remote system is then granted access to the second file system (block 716). The remote system uses the location information found in the second file system to access the selected files on the mass storage device at the level of access indicated by the user (block 718).

Although the above embodiment describes the information written to the second file system as location information, one of ordinary skill in the art would recognize that any type of information, such as a filename or hash, which allows the remote system to find the selected files may be used.

Figure 8:
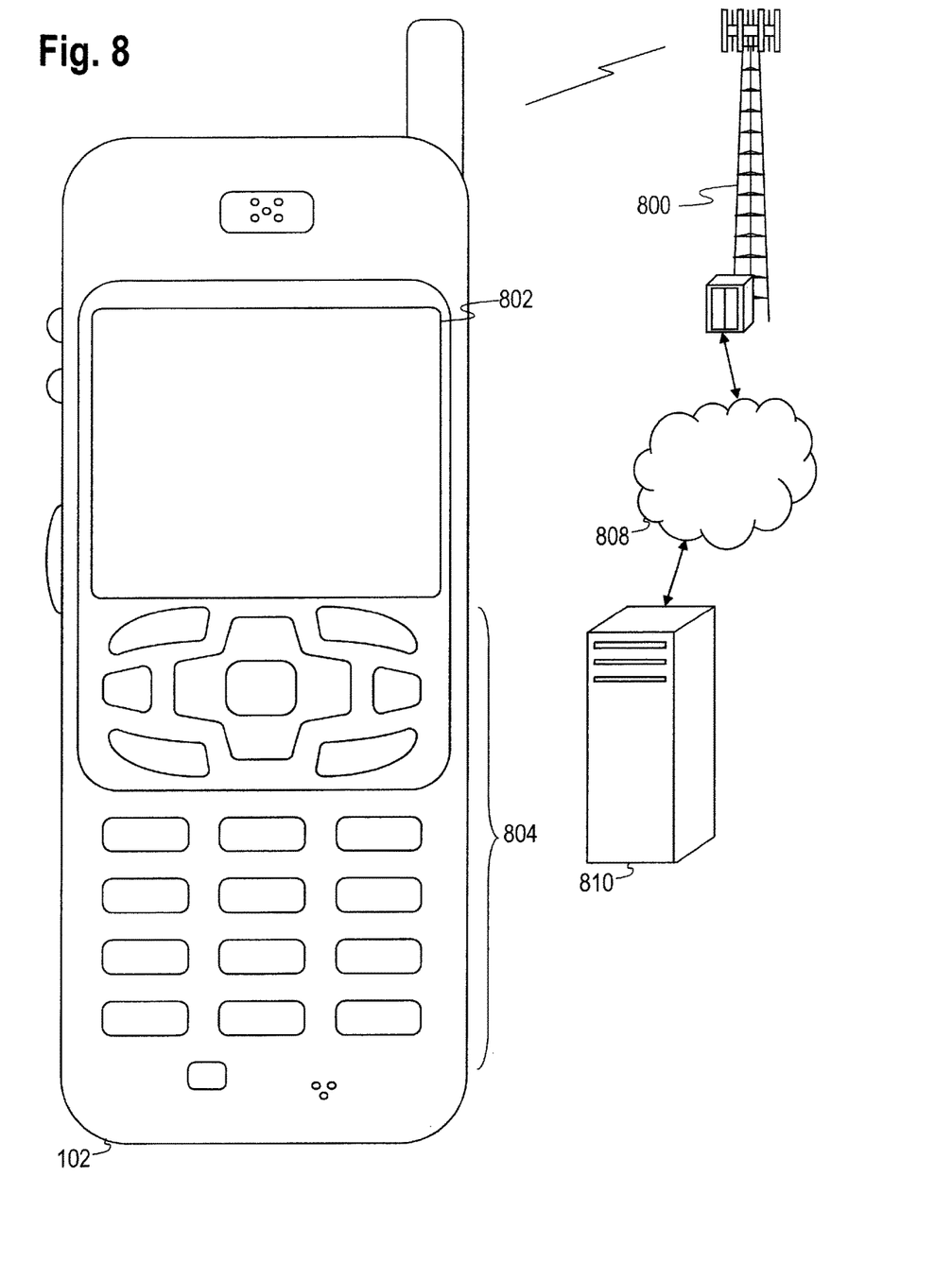
FIG. 8 is a diagram of a wireless communications system including user equipment operable for some of the various embodiments of the disclosure.

FIG. 8 illustrates a wireless communications system including an embodiment of UE 102. The UE 102 is operable for implementing aspects of the disclosure, but the disclosure should not be limited to these implementations. Though illustrated as a mobile phone, the UE 102 and the remote system 104 may take various forms including a wireless handset, a pager, a personal digital assistant (PDA), a portable computer, a tablet computer, or a laptop computer. Many suitable devices combine some or all of these functions. In some embodiments of the disclosure, the UE 102 is not a general purpose computing device like a portable, laptop or tablet computer, but rather is a special-purpose communications device such as a mobile phone, wireless handset, pager, or PDA. In another embodiment, the UE 102 may be a portable, laptop or other computing device. The UE 102 may support specialized activities such as gaming, inventory control, job control, and/or task management functions, and so on.

The UE 102 includes a display 802. The UE 102 also includes a touch-sensitive surface, a keyboard or other input keys generally referred as 804 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UE 102 may present options for the user to select, controls for the user to actuate, and/or cursors or other indicators for the user to direct. The UE 102 may further accept data entry from the user, including numbers to dial or various parameter values for configuring the operation of the UE 102. The UE 102 may further execute one or more software or firmware applications in response to user commands. These applications may configure the UE 102 to perform various customized functions in response to user interaction. Additionally, the UE 102 may be programmed and/or configured over-the-air, for example from a wireless base station, a wireless access point, or a peer UE 102.

Among the various applications executable by the UE 102 are a web browser, which enables the display 802 to show a web page. The web page may be obtained via wireless communications with a wireless network access node, a cell tower, a peer UE 102, or any other wireless communication network or system 800. The network 800 is coupled to a wired network 808, such as the Internet. Via the wireless link and the wired network, the UE 102 has access to information on various servers, such as a server 810. The server 810 may provide content that may be shown on the display 802. Alternately, the UE 102 may access the network 800 through a peer UE 102 acting as an intermediary, in a relay type or hop type of connection.

Figure 9:
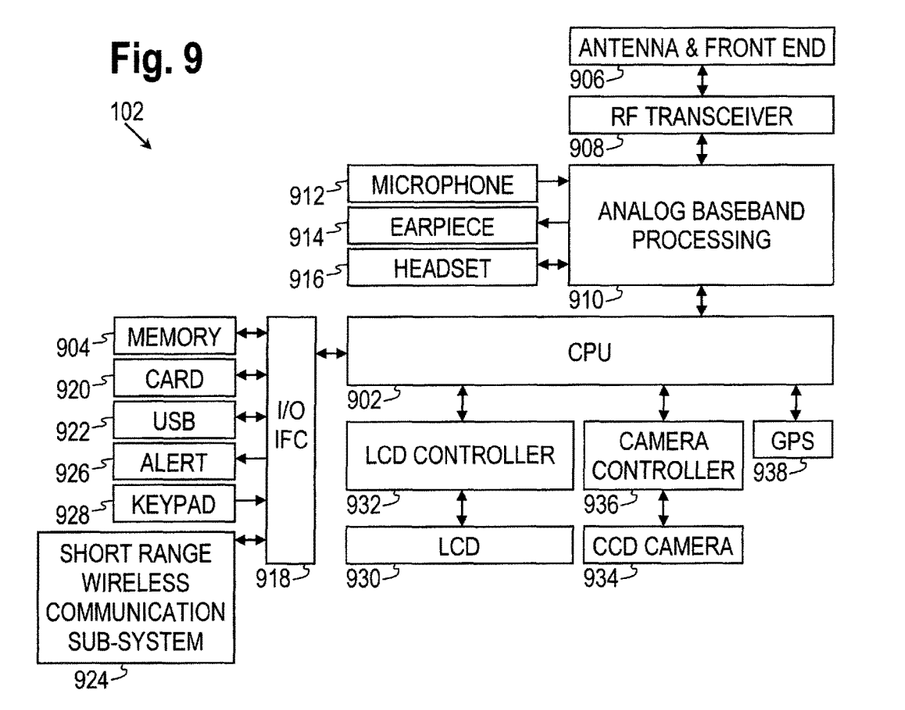
FIG. 9 is a block diagram of user equipment operable for some of the various embodiments of the disclosure.

FIG. 9 shows a block diagram of the UE 102. While a variety of known components of UEs 102 are depicted, in an embodiment a subset of the listed components and/or additional components not listed may be included in the UE 102. The UE 102 includes a central processing unit (CPU) 902 and a memory 904. As shown, the UE 102 may further include an antenna and front end unit 906, a radio frequency (RF) transceiver 908, an analog baseband processing unit 910, a microphone 912, an earpiece speaker 914, a headset port 916, an input/output interface 918, a removable memory card 920, a universal serial bus (USB) port 922, a short range wireless communication sub-system 924, an alert 926, a keypad 928, a liquid crystal display (LCD), which may include a touch sensitive surface 930, an LCD controller 932, a charge-coupled device (CCD) camera 934, a camera controller 936, and a global positioning system (GPS) sensor 938. In an embodiment, the UE 102 may include another kind of display that does not provide a touch sensitive screen. In an embodiment, the CPU 902 may communicate directly with the memory 904 without passing through the input/output interface 918.

The CPU 902 or some other form of controller or central processing unit operates to control the various components of the UE 102 in accordance with embedded software or firmware stored in memory 904 or stored in memory contained within the CPU 902 itself. In addition to the embedded software or firmware, the CPU 902 may execute other applications stored in the memory 904 or made available via information carrier media such as portable data storage media like the removable memory card 920 or via wired or wireless network communications. The application software may comprise a compiled set of machine-readable instructions that configure the CPU 902 to provide the desired functionality, or the application software may be high-level software instructions to be processed by an interpreter or compiler to indirectly configure the CPU 902.

The antenna and front end unit 906 may be provided to convert between wireless signals and electrical signals, enabling the UE 102 to send and receive information from a cellular network or some other available wireless communications network or from a peer UE 102. In an embodiment, the antenna and front end unit 906 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 906 may include antenna tuning and/or impedance matching components, RF power amplifiers, and/or low noise amplifiers.

The RF transceiver 908 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 910 and/or the CPU 902 or other central processing unit. In some embodiments, the RF Transceiver 908, portions of the Antenna and Front End 906, and the analog baseband processing unit 910 may be combined in one or more processing units and/or application specific integrated circuits (ASICs).

The analog baseband processing unit 910 may provide various analog processing of inputs and outputs, for example analog processing of inputs from the microphone 912 and the headset 916 and outputs to the earpiece 914 and the headset 916. To that end, the analog baseband processing unit 910 may have ports for connecting to the built-in microphone 912 and the earpiece speaker 914 that enable the UE 102 to be used as a cell phone. The analog baseband processing unit 910 may further include a port for connecting to a headset or other hands-free microphone and speaker configuration. The analog baseband processing unit 910 may provide digital-to-analog conversion in one signal direction and analog-to-digital conversion in the opposing signal direction. In some embodiments, at least some of the functionality of the analog baseband processing unit 910 may be provided by digital processing components, for example by the CPU 902 or by other central processing units.

The CPU 902 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the CPU 902 may perform modulation, coding, interleaving, and spreading, and for a receiver function the CPU 902 may perform despreading, deinterleaving, decoding, and demodulation. In another embodiment, for example in an orthogonal frequency division multiplex access (OFDMA) technology application, for the transmitter function the CPU 902 may perform modulation, coding, interleaving, inverse fast Fourier transforming, and cyclic prefix appending, and for a receiver function the CPU 902 may perform cyclic prefix removal, fast Fourier transforming, deinterleaving, decoding, and demodulation. In other wireless technology applications, yet other signal processing functions and combinations of signal processing functions may be performed by the CPU 902.

The CPU 902 may communicate with a wireless network via the analog baseband processing unit 910. In some embodiments, the communication may provide Internet connectivity, enabling a user to gain access to content on the Internet and to send and receive e-mail or text messages. The input/output interface 918 interconnects the CPU 902 and various memories and interfaces. The memory 904 and the removable memory card 920 may provide software and data to configure the operation of the CPU 902. Among the interfaces may be the USB interface 922 and the short range wireless communication sub-system 924. The USB interface 922 may be used to charge the UE 102 and may also enable the UE 102 to function as a peripheral device to exchange information with a personal computer or other computer system. The short range wireless communication sub-system 924 may include an infrared port, a Bluetooth interface, an IEEE 802.11 compliant wireless interface, or any other short range wireless communication sub-system, which may enable the UE 102 to communicate wirelessly with other nearby mobile devices and/or wireless base stations.

The input/output interface 918 may further connect the CPU 902 to the alert 926 that, when triggered, causes the UE 102 to provide a notice to the user, for example, by ringing, playing a melody, or vibrating. The alert 926 may serve as a mechanism for alerting the user to any of various events such as an incoming call, a new text message, and an appointment reminder by silently vibrating, or by playing a specific pre-assigned melody for a particular caller.

The keypad 928 couples to the CPU 902 via the interface 918 to provide one mechanism for the user to make selections, enter information, and otherwise provide input to the UE 102. The keyboard 928 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 930, which may include touch screen capability and also display text and/or graphics to the user. The LCD controller 932 couples the CPU 902 to the LCD 930.

The CCD camera 934, if equipped, enables the UE 102 to take digital pictures. The CPU 902 communicates with the CCD camera 934 via the camera controller 936. In another embodiment, a camera operating according to a technology other than Charge Coupled Device cameras may be employed. The GPS sensor 938 is coupled to the CPU 902 to decode global positioning system signals, thereby enabling the UE 102 to determine its position. Various other peripherals may also be included to provide additional functions, e.g., radio and television reception.

Figure 10:
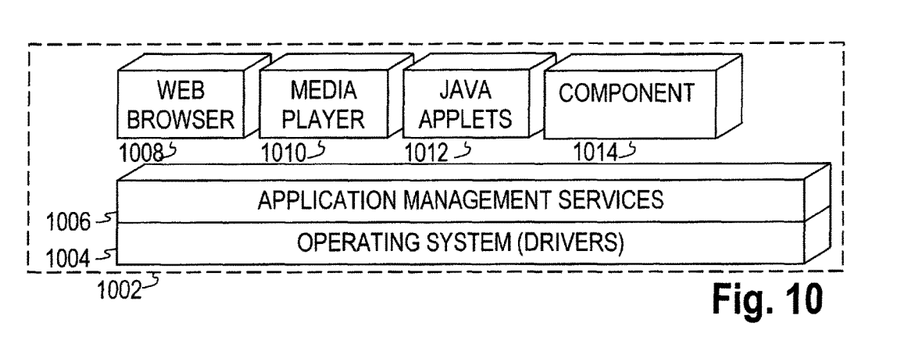
FIG. 10 is a diagram of a software environment that may be implemented on user equipment operable for some of the various embodiments of the disclosure.

FIG. 10 illustrates a software environment 1002 that may be implemented by the CPU 902. The CPU 902 executes operating system drivers 1004 that provide a platform from which the rest of the software operates. The operating system drivers 1004 provide drivers for the UE hardware with standardized interfaces that are accessible to application software. The operating system drivers 1004 include application management services ("AMS") 1006 that transfer control between applications running on the UE 102. Also shown in FIG. 10 are a web browser application 1008, a media player application 1010, and Java applets 1012. The web browser application 1008 configures the UE 102 to operate as a web browser, allowing a user to enter information into forms and select links to retrieve and view web pages. The media player application 1010 configures the UE 102 to retrieve and play audio or audiovisual media. The Java applets 1012 configure the UE 102 to provide games, utilities, and other functionality.

Figure 11:
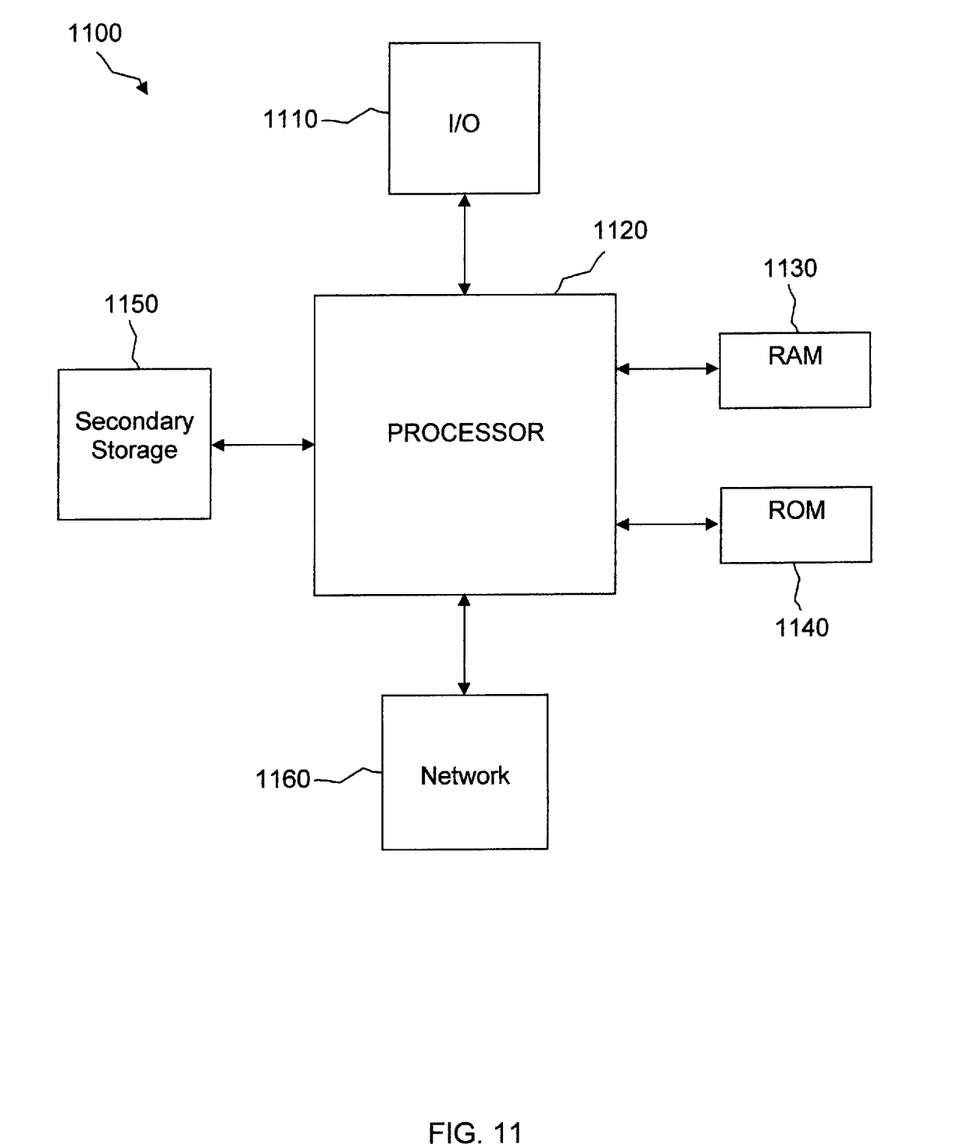
FIG. 11 is an illustrative general purpose computer system suitable for some of the various embodiments of the disclosure.

FIG. 11 illustrates a typical, general-purpose computer system 1100 that may be suitable for implementing one or more embodiments disclosed herein. The computer system 1100 includes a processor 1120 (which may be referred to as a central processor unit or CPU) that is in communication with memory devices including secondary storage 1150, read only memory (ROM) 1140, random access memory (RAM) 1130, input/output (I/O) devices 1110, and network connectivity devices 1160. The processor may be implemented as one or more CPU chips.

The secondary storage 1150 is typically comprised of one or more disk drives or tape drives and is used for non-volatile storage of data and as an over-flow data storage device if RAM 1130 is not large enough to hold all working data. Secondary storage 1150 may be used to store programs which are loaded into RAM 1130 when such programs are selected for execution. The ROM 1140 is used to store instructions and perhaps data which are read during program execution. ROM 1140 is a non-volatile memory device which typically has a small memory capacity relative to the larger memory capacity of secondary storage. The RAM 1130 is used to store volatile data and perhaps to store instructions. Access to both ROM 1140 and RAM 1130 is typically faster than to secondary storage 1150.

I/O devices 1110 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 1160 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 1160 devices may enable the processor 1120 to communicate with an Internet or one or more intranets. With such a network connection, it is contemplated that the processor 1120 might receive information from the network, or might output information to the network in the course of performing the above-described method steps. Such information, which is often represented as a sequence of instructions to be executed using processor 1120, may be received from and outputted to the network, for example, in the form of a computer data signal embodied in a carrier wave.

Such information, which may include data or instructions to be executed using processor 1120 for example, may be received from and outputted to the network, for example, in the form of a computer data baseband signal or signal embodied in a carrier wave. The baseband signal or signal embodied in the carrier wave generated by the network connectivity 1160 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 1120 executes instructions, codes, computer programs, scripts which it accesses from hard disk, floppy disk, optical disk (these various disk based systems may all be considered secondary storage 1150), ROM 1140, RAM 1130, or the network connectivity devices 1160.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile device file sharing system comprising:
   a storage device storing a first file and a second file;
   a network connectivity device for connecting the mobile device to a remote system;
   a user interface configurable to detect selection of the first file stored on the storage device and to detect selection of a type of access by the remote system as read/write or read-only; and
   a file system created responsive to selection of the first file to contain an access information for the first file and not the second file, the file system comprising at least one of a file allocation table (FAT) file system, a file allocation table-32 (FAT-32) file system, a New Technology File System (NTFS), a second extended (Ext2) file system, a third extended (Ext3) file system, and a UNIX file system (UFS);
   wherein when the mobile device is connected to the remote system via the network connectivity device, the remote system can only access the first file as read/write or read-only as designated by the user using the access information in the file system and the remote system only has knowledge of the selected one or more files including the first file.

2. The mobile device file sharing system of claim 1, wherein the storage device is a removable memory card.

3. The mobile device file sharing system of claim 1, wherein the network connectivity device communicates using a universal serial bus protocol, a firewire protocol, or an RS-232 serial protocol.

4. The mobile device file sharing system of claim 1, wherein the network connectivity device comprises a wireless connection.

5. The mobile device file sharing system of claim 1, wherein the user interface is configured to detect selection of the first file and a third file stored on the storage device, wherein the file system is created responsive to selection of the first file and the third file and wherein the file system further contains an access information for the third file.

6. The mobile device file sharing system of claim 5, wherein two of the first file, the second file, and the third file on the storage device are stored under one or more directories.

7. The mobile device file sharing system of claim 6, wherein the user interface is enabled for the selection of a directory on the storage device such that when the mobile device is connected to the remote system via the network connectivity device, the remote system can only access the selected directory.

8. A method for mobile device file sharing comprising:
   storing a first file and a second file on a storage device;
   connecting the mobile device to a remote system via a network connectivity device;
   detecting, via a user interface, selection of the first file stored on the storage device and detecting selection of a type of access by the remote system as read/write or read-only; and
   creating a file system responsive to selection of the first file to contain an access information for the first file and not the second file, the file system comprising at least one of a file allocation table (FAT) file system, a file allocation table-32 (FAT-32) file system, a New Technology File System (NTFS), a second extended (Ext2) file system, a third extended (Ext3) file system, and a UNIX file system (UFS);
   wherein when the mobile device is connected to the remote system via the network connectivity device, the remote system can only access the first file as read/write or read-only as designated by the user using the access information in the file system and the remote system only has knowledge of the selected one or more files including the first file.

9. The method for mobile device file sharing of claim 8, wherein the storage device is a removable memory card.

10. The method for mobile device file sharing of claim 8, wherein the network connectivity device communicates using a universal serial bus protocol, a firewire protocol, or an RS-232 serial protocol.

11. The method for mobile device file sharing of claim 8, wherein the network connectivity device comprises a wireless connection.

12. The method for mobile device file sharing of claim 8, further comprising detecting selection, by the user interface, of the first file and a third file stored on the storage device, wherein the file system is created responsive to selection of the first file and the third file and wherein the file system further contains an access information for the third file.

13. The method for mobile device file sharing of claim 12, wherein two of the first file, the second file, and the third file on the storage device are stored under one or more directories.

14. The method for mobile device file sharing system of claim 13, further comprising selecting, by the user interface, a directory on the storage device such that when the mobile device is connected to the remote system via the network connectivity device, the remote system can only access the selected directory.

15. A non-transitory computer readable medium comprising instructions that when executed by a processor of a mobile device cause the processor to:
   store a first file and a second file on a storage device;
   connect the mobile device to a remote system via a network connectivity device;
   detect, via a user interface, selection of the first file stored on the storage device and detect selection of a type of access by the remote system as read/write or read-only; and
   create a file system responsive to selection of the first file to contain an access information for the first file and not the second file, the file system comprising at least one of a file allocation table (FAT) file system, a file allocation table-32 (FAT-32) file system, a New Technology File System (NTFS), a second extended (Ext2) file system, a third extended (Ext3) file system, and a UNIX file system (UFS);
   wherein when the mobile device is connected to the remote system via the network connectivity device, the remote system can only access the first file as read/write or read-only as designated by the user using the access information in the file system and the remote system only has knowledge of the selected one or more files including the first file.

16. The non-transitory computer readable medium of claim 15, wherein the network connectivity device communicates using a universal serial bus protocol, a firewire protocol, or an RS-232 serial protocol.

17. The non-transitory computer readable medium of claim 15, wherein the network connectivity device comprises a wireless connection.

18. The non-transitory computer readable medium of claim 15, further comprising the detect selection, by the user interface, of the first file and a third file stored on the storage device, wherein the file system is created responsive to selection of the first file and the third file and wherein the file system further contains an access information for the third file.

19. The non-transitory computer readable medium of claim 18, wherein two of the first file, the second file, and the third file on the storage device are stored under one or more directories.

20. The non-transitory computer readable medium of claim 19, further comprising selection, by the user interface, of a directory on the storage device such that when the mobile device is connected to the remote system via the network connectivity device, the remote system can only access the selected directory.

* * * * *